United States Patent
Quach et al.

(10) Patent No.: US 6,895,527 B1
(45) Date of Patent: May 17, 2005

(54) ERROR RECOVERY FOR SPECULATIVE MEMORY ACCESSES

(75) Inventors: Nhon Toai Quach, Santa Clara, CA (US); Len Schultz, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 539 days.

(21) Appl. No.: 09/676,311

(22) Filed: Sep. 30, 2000

(51) Int. Cl.$^7$ .............................................. G06F 11/00
(52) U.S. Cl. .................................... 714/5; 712/244
(58) Field of Search .............................. 714/5; 712/244

(56) References Cited

U.S. PATENT DOCUMENTS

| | | | | |
|---|---|---|---|---|
| 5,692,169 A | * | 11/1997 | Kathail et al. | 712/244 |
| 5,748,936 A | * | 5/1998 | Karp et al. | 712/218 |
| 5,778,219 A | * | 7/1998 | Amerson et al. | 712/244 |
| 5,802,337 A | | 9/1998 | Fielden | |
| 5,864,692 A | * | 1/1999 | Faraboschi et al. | 712/216 |
| 5,881,280 A | * | 3/1999 | Gupta et al. | 712/244 |
| 5,915,117 A | * | 6/1999 | Ross et al. | 710/262 |
| 5,948,095 A | | 9/1999 | Arora et al. | |
| 6,119,218 A | * | 9/2000 | Arora et al. | 712/207 |
| 6,216,214 B1 | * | 4/2001 | Bryg et al. | 711/207 |
| 6,263,401 B1 | * | 7/2001 | Ross et al. | 711/109 |
| 6,314,513 B1 | * | 11/2001 | Ross et al. | 712/228 |
| 6,321,328 B1 | * | 11/2001 | Karp et al. | 712/225 |
| 6,519,694 B2 | * | 2/2003 | Harris | 712/220 |
| 6,567,901 B1 | * | 5/2003 | Neufeld | 711/158 |

OTHER PUBLICATIONS

Intel® IA–64 Architecture Software Developer's Manual, vol. 1: IA–64 Application Architecture, Revision 1.1, Jul. 2000, Document No.: 245317–002.
Intel® IA–64 Architecture Software Developer's Manual, vol. 2: IA–64 Application Architecture, Revision 1.1, Jul. 2000, Document No.: 245318–002.
Pentium® Pro Family Developer's Manual, vol. 2: Programmer's Reference Manual, Intel, 1996, pps. 4–10 to 4–15.
IA–32 Intel® Architecture Software Developer's Manual, System Programming Guide, 2004, vol. 3 pp. 5–1 thru 5–60, 14–1 thru 14–22.

* cited by examiner

*Primary Examiner*—Scott Baderman
*Assistant Examiner*—Joshua Lohn
(74) *Attorney, Agent, or Firm*—Blakely, Sokoloff, Taylor & Zafman LLP

(57) ABSTRACT

A method of handling memory errors. A memory fault indication is received that is true if an error in the memory is detected while executing a memory load request to retrieve a value from the memory. A speculative load indication is received that is true if the memory load request was issued speculatively. If the memory fault indication is true and the speculative load indication is true, then an error indication that the returned value is invalid is provided, otherwise, error recovery is performed.

16 Claims, 2 Drawing Sheets

ERROR RECOVERY FOR SPECULATIVE MEMORY ACCESSES

FIELD OF THE INVENTION

This invention relates to computer memory error recovery and, more particularly, to error recovery from errors detected during speculative memory accesses.

BACKGROUND OF THE INVENTION

A general purpose computer uses a central processor unit (CPU) to perform instructions on data. The instructions to be executed and the data required by those instructions are read from a computer memory. The overall speed of the computer is affected both by the speed at which the CPU can execute instructions and the speed at which the memory can provide instructions and data to the CPU. To improve the speed at which instructions and data are supplied by the memory, modem computers often issue and complete memory transactions speculatively. That is, the processor predicts what instructions and data are likely to be needed in the near future and the memory is accessed to obtain instructions and/or data prior to the actual requirement for the speculatively accessed memory contents.

Computer memories are subject to a variety of transient failures that result in corruption of the content of a particular memory location. While such transient corruption is infrequent, the consequences of such corruption, particularly if the content represents an instruction to be executed, can be catastrophic to the proper execution of a computer program. Computers may include means to detect errors in the contents retrieved by a memory access. There may be further means to correct at least some detected errors. Such error detecting and correcting means generally introduce a substantial delay in the processing when an error is detected. Uncorrected errors may require abnormal termination of an executing program. Simplicity and low-cost in error recovery processing is favored over speed because memory errors are encountered infrequently.

In a computer that uses speculative memory accesses, memory errors may be detected during a speculative memory access. A significant proportion of the memory accesses may be speculative accesses in a computer that uses speculative accesses. A significant proportion of the speculative accesses may be for memory contents that will not be used by the CPU during the time the contents are available from the speculative access. The delays introduced by the error recovery processing for speculatively accessed corrupted memory contents adds an unnecessary overhead when the contents are not actually required by the CPU. An uncorrectable error detected during a speculative access can cause a potentially unnecessary abnormal termination of an executing program.

DETAILED DESCRIPTION OF THE INVENTION

Memory includes any source of instructions and/or data that a machine, such as a computer, can access. Memory can include, but is not limited to, cache memory including both tags and data, random access memory (RAM), read-only memory (ROM), bulk storage devices such as fixed or removable disks including both read-write and read-only devices, and network devices that provide data accessed from other computers or other devices not directly part of the accessing computer.

A machine-readable medium includes any mechanism that provides, stores, or transmits information in a form readable by a machine, such as a computer. A machine-readable medium includes, but is not limited to, read only memory (ROM), random access memory (RAM), magnetic disk storage media, optical storage media, flash memory devices, and electrical, optical, acoustical or other form of propagated signals, such as carrier waves, infrared signals, or digital signals.

Logical indications such as true and false include any form of information that is defined and interpreted to indicate a particular logical condition. For example, a single bit flag has two logical states, commonly indicated as 0 and 1. The logical state 0 of such a flag may indicate false in one embodiment of a logical indication. In another embodiment, 0 may indicate true. Logical indications may have more than two states with particular values defined to indicate particular logical states.

A system is a combination of devices that includes a machine, and a memory coupled to the machine. A system may include additional elements in support of the machine and memory such as error detection mechanisms. A machine, such as a computer for example, that loads data values from a memory may use an error detecting mechanism for detecting errors in the values loaded from the memory. Errors are differences between the value as stored into the memory and the value as loaded from the memory. These errors may be "soft" errors that occur intermittently due to cosmic ray and alpha particle bombardment of the memory device. An example of a mechanism for detecting errors is a parity bit associated with a memory value. The error detecting mechanism may also provide for correcting some errors. An example of such a mechanism is an error correcting code (ECC) associated with a memory value. The error detecting mechanism may provide a memory fault indication that is true if an error in the memory is detected while executing a memory load request to retrieve a value from the memory. A cache memory error on a line that is clean or shared can be corrected by invalidating the line. If the line is dirty, then the error is not recoverable.

Figure 1:
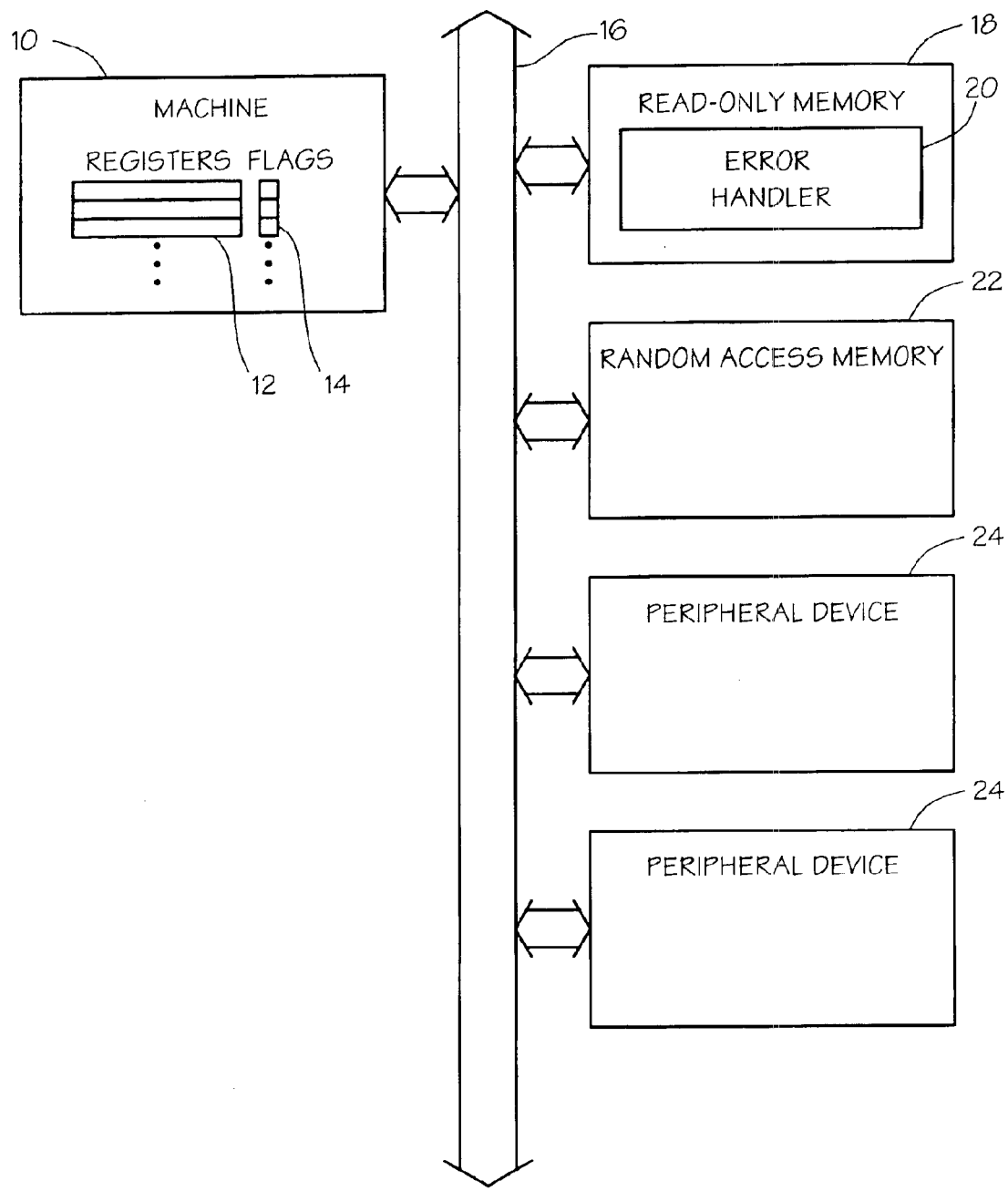
FIG. 1 is a block diagram of a computer system that embodies the invention.

FIG. 1 shows a computer system that embodies the invention. The exemplary system may include a machine 10 coupled to a read-only memory 18, a random access memory 22, and one or more peripheral devices 24 by a bus 16. Instructions for an error handler 20 according to the present invention may be stored in the read-only memory 18 which when executed by the machine 10, cause the machine to perform operations to respond to memory error indications and provide recovery from the memory error. The memory error handler may be executed by the machine when a memory load request returns a value retrieved from the memory with the memory fault indication set true. If the memory error handler is unable to correct the memory error, recovery may be termination of the program that issued the memory load request. If the memory error handler is able to correct the memory error, recovery may require a lengthy sequence of instruction to perform the correction.

Figure 2:
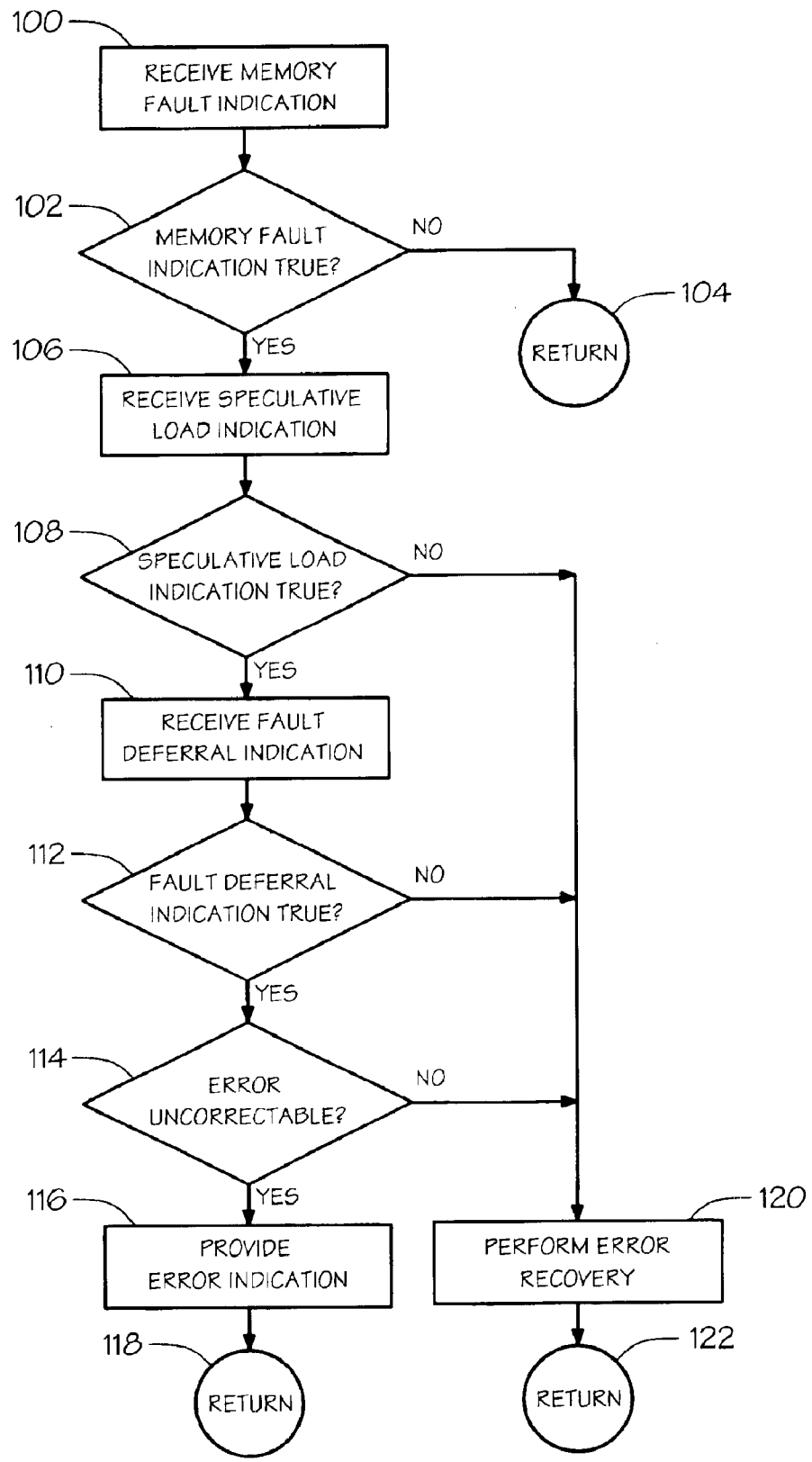
FIG. 2 is a flowchart of the method of the invention.

FIG. 2 shows a flowchart of instruction execution for a memory error handler that embodies the present invention. The memory error handler receives a memory fault indication 100. If the memory fault indication is not true there is no memory error to be handled and the memory error handler returns 104 without performing any error handling. It will be appreciated that in other embodiments the memory error handler will not be executed unless there is a memory fault indication and the memory error handler may not receive or test the memory fault indication since that test will have occurred outside the memory error handler.

The memory error handler according to the present invention may handle errors generated by speculative loads differently from errors generated by non-speculative loads. If the memory load request is speculative, the memory value is being loaded in anticipation of a future need for that value. The speculatively loaded value may or may not actually be used. It may be desirable to defer performing error correction for errors generated by speculative loads. The load instruction may be a special speculative load instruction that sets a testable flag to indicate that a speculative instruction is being executed that may be used as a speculative load indication. The software that issues the load instruction may know that the load is speculative and provide a speculative load indication.

A memory handler according to the present invention may receive a speculative load indication 106 that is true if the memory load request was issued speculatively. If the speculative load indication is not true 108, control is passed to the instructions for performing error recovery 120. If the memory fault indication is true 102 and the speculative load indication is true 108, then an error indication that the returned value is invalid may be provided 116. This allows error recovery to be deferred for errors that are detected during speculative memory accesses. Deferral is the process of generating a deferred exception indicator 116 and not performing the error recovery 120 at the time of its detection (and potentially never at all). The memory error handler returns 118 control to the program that invoked the memory error handler after providing the error indication 116. Deferring recovery of errors detected during speculative loads may avoid termination of an executing program for unrecoverable errors when the speculatively loaded value is not actually required by the executing program. Deferring recovery of correctable error may improve performance by avoiding the time required to perform error recovery of unused values. It may be possible for programs to use a speculative load for testing a memory location or a device for errors prior to using the memory location or device.

In the machine 10 shown in FIG. 1, flag bits 14 are associated with the registers 12. The error indication may be returned by setting a value, such as false, into the flag bit 14 associated with the register 12 that is loaded with the returned value. The program that intends to use the loaded value may check the associated flag bit 14 to determine if the value is valid. If the value is invalid, the program may issue a non-speculative load for the value to force the memory error handling routine to perform error recovery. This may terminate the executing program or this may provide a corrected value to the executing program.

The error indication may be returned by setting the returned value to an invalid value. For example, if the value is an integer with a sign bit, the value of negative zero could be defined as an invalid value that could be used to provide the error indication from the memory error handler. The program that intends to use the loaded value may check the value for validity before using the value. If the value is invalid, the program may issue a non-speculative load for the value to force the memory error handling routine to perform error recovery. This may terminate the executing program or this may provide a corrected value to the executing program.

In an embodiment of the invention on a machine that does not provide a mechanism for error recovery, the executing program may terminate if an invalid value is detected with issuing a non-speculative load for the value.

Error recovery is performed 120 immediately if the memory fault indication is true 102 and the speculative load indication is not true 108. The memory error handler returns 122 control to the program that invoked the memory error handler after performing error recovery 122.

In another embodiment of the invention, the memory error handler may receive a fault deferral indication 110 that is true if faults can be deferred. This allows the treatment of errors on speculative loads by the memory error handler to be controlled. Another program, such as the executing program or the operating system, may set or clear the fault deferral indication to allow or prevent deferred recovery from errors on speculative loads. If the fault deferral indication is not true 112 error recovery 120 for errors generated by speculative loads is performed immediately. In other embodiments, the fault deferral indication may provide multiple states. This may allow non-recoverable errors to be deferred and cause correctable errors to be immediately corrected 114.

It will be appreciated that the invention is applicable to a variety of machines that load values from a memory. One example would be a central processor unit (CPU) loading values from a cache memory or a random access memory (RAM) or a secondary memory, such as a disk drive. Another example would be a peripheral processor that loads values from a peripheral device, such as a network.

The Intel® IA-64 Architecture is an example of a processor architecture that supports speculative memory loads. The use of the invention with the IA-64 Architecture will be described as an exemplary embodiment of the invention. General registers 12 in the IA-64 provide a Not a Thing (NaT) bit 14 to provide a deferred exception indicator. Floating point registers provide a Not a Thing Value (NaTVal) to provide a deferred exception indicator. The present invention can use the NaT bit or the NaTVal as the error indication that the returned value is invalid. Once a deferred exception indicator is generated, it will propagate through all uses until the speculation is checked by using either a speculation check instruction or a non-speculative use. This causes the appropriate action to be invoked to deal with the exception.

Three different programming models are supported by the IA-64 Architecture: no-recovery, recovery and always-defer. These programming models are selected by bits in the Processor Status Register (PSR). In the no-recovery model, only fatal exceptional conditions are deferred—these are conditions which cannot be resolved without either involving the program's exception-handling code or terminating the program. The inventive memory handler will defer only uncorrectable memory errors. In the recovery model, performance may be increased by deferring additional exceptional conditions. The recovery model is used only if the program provides additional "recovery" code to re-execute failed speculative computations. In always-defer model, all exceptional conditions which can be deferred are deferred. This permits speculation in environments where faulting would be unrecoverable. The inventive memory handler will defer both correctable and uncorrectable memory errors in the recovery model and the always-defer model.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of handling memory errors comprising:
receiving and retaining control of a machine from an executing program after corruption of a memory value is detected while executing a memory load request issued by the executing program to retrieve the memory value from the memory;
receiving a speculative load indication that is true if the memory load request was issued speculatively;
reading a fault deferral indication that is true if faults caused by corruption of memory values can be deferred, the fault deferral indication being set before the corruption of the memory value is detected;
if the fault deferral indication is true and the speculative load indication is true, then
providing an error indication that the returned memory value is invalid, and;
returning control of the machine to the executing program;
otherwise
attempting to correct the corruption of the memory value, and
if the corruption of the memory value is correctable, then
returning control of the machine to the executing program,
otherwise
transferring control of the machine to exception-handling code.

2. The method of claim 1, wherein the error indication is a flag bit associated with the returned memory value.

3. The method of claim 1, wherein the error indication is setting the returned memory value to an invalid value.

4. The method of claim 1, wherein the machine further provides first programming model and a second programming model, and providing the error indication that the returned memory value is invalid further requires that the second programming model be selected.

5. A machine-readable medium that provides instructions, which when executed by a machine, cause the machine to perform operations comprising:
receiving and retaining control of the machine from an executing program after corruption of a memory value is detected while executing a memory load request issued by the executing program to retrieve the memory value from the memory;
receiving a speculative load indication that is true if the memory load request was issued speculatively;
reading a fault deferral indication that is true if faults caused by corruption of memory values can be deferred, the fault deferral indication being set before the corruption of the memory value is detected;
if the fault deferral indication is true and the speculative load indication is true, then
providing an error indication that the returned memory value is invalid, and
returning control of the machine to the executing program;
otherwise
attempting to correct the corruption of the memory value, and
if the corruption of the memory value is correctable, then
returning control of the machine to the executing program,
otherwise
transferring control of the machine to exception-handling code.

6. The machine-readable medium of claim 5, wherein the error indication is a flag bit associated with the returned memory value.

7. The machine-readable medium of claim 5, wherein the error indication is setting the returned value to an invalid memory value.

8. The machine-readable medium of claim 5, wherein the machine further provides first programming model and a second programming model, and providing the error indication that the returned memory value is invalid further requires that the second programming model be selected.

9. A machine comprising:
an interface to receive a value from a memory coupled to the machine;
a speculative load indicator that is true if the memory load request was issued speculatively; and
a fault deferral indicator that is true if faults caused by corruption of memory values can be deferred, the fault deferral indicator being set before the corruption of the memory value is detected;
a machine-readable medium that provides instructions, which when executed by the machine, cause the machine to perform operations including
receiving and retaining control of the machine from an executing program after corruption of the memory value is detected while executing a memory load request issued by the executing program to retrieve the memory value from the memory;
if the fault deferral indication is true and the speculative load indication is true, then
providing an error indication that the returned memory value is invalid, and
returning control of the machine to the executing program;
otherwise
attempting to correct the corruption of the memory value, and
if the corruption of the memory value is correctable, then
returning control of the machine to the executing program,
otherwise
transferring control of the machine to exception-handling code.

10. The machine of claim 9, wherein the machine further comprises a register to receive the memory value, and a flag bit associated with the register, wherein the error indication is a defined value of the flag bit.

11. The machine of claim 9, wherein the machine further comprises a register to receive the memory value, and the error indication is an invalid memory value in the register.

12. The machine of claim 9, wherein the machine further provides first programming model and a second programming model, and providing the error indication that the returned memory value is invalid further requires that the second programming model be selected.

13. A system comprising:
a machine;
a memory that includes an error correcting code coupled to the machine; and a machine-readable medium that provides instructions, which when executed by the machine, cause the machine to perform operations including
  receiving and retaining control of the machine from an executing program after corruption of the memory value is detected by the error correcting code while executing a memory load request issued by the executing program to retrieve the memory value from the memory,
  reading a fault deferral indication that is true if faults caused by corruption of memory values can be deferred, the fault deferral indication being set before the corruption of the memory value is detected;
  receiving a speculative load indication that is true if the memory load request was issued speculatively,
  if the fault deferral indication is true and the speculative load indication is true,
  if the fault deferral indication is true and the speculative load indication is true, then
    providing an error indication that the returned memory value is invalid, and
    returning control of the machine to the executing program;
  otherwise
    attempting to correct the corruption of the memory value by use of the error correcting code, and
    if the corruption of the memory value is correctable, then
      returning control of the machine to the executing program,
    otherwise
      transferring control of the machine to exception-handling code.

14. The system of claim 13, wherein the machine further comprises a register to receive the memory value, and a flag bit associated with the register, wherein the error indication is a defined value of the flag bit.

15. The system of claim 13, wherein the machine further comprises a register to receive the memory value, and the error indication is an invalid memory value in the register.

16. The system of claim 13, wherein the machine further provides first programming model and a second programming model, and providing the error indication that the returned memory value is invalid further requires that the second programming model be selected.

* * * * *